(12) United States Patent
Anderson et al.

(10) Patent No.: US 8,306,844 B2
(45) Date of Patent: Nov. 6, 2012

(54) METHODS AND APPARATUS TO GENERATE A SMART TEXT MARKET CHANGE DESCRIPTOR

(75) Inventors: Rich J. Anderson, Fort Mill, SC (US); David S. Dyson, Vincentown, NJ (US); Mark Ahrens, Milford, CT (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 632 days.

(21) Appl. No.: 12/363,040

(22) Filed: Jan. 30, 2009

(65) Prior Publication Data

US 2009/0222325 A1  Sep. 3, 2009

Related U.S. Application Data

(60) Provisional application No. 61/025,147, filed on Jan. 31, 2008.

(51) Int. Cl.
*G06Q 10/00* (2012.01)
(52) U.S. Cl. ........................................... 705/7.29
(58) Field of Classification Search ................ 705/26.1, 705/27.1, 306, 7.29
See application file for complete search history.

(56) References Cited

U.S. PATENT DOCUMENTS

| | | | |
|---|---|---|---|
| 5,838,323 A | 11/1998 | Rose et al. | |
| 5,963,919 A | 10/1999 | Brinkley et al. | |
| 6,078,924 A | 6/2000 | Ainsbury et al. | |
| 6,205,431 B1 | 3/2001 | Willemain et al. | |
| 6,810,384 B1 * | 10/2004 | Cooper | 705/7.29 |
| 6,834,266 B2 | 12/2004 | Kumar et al. | |
| 6,976,001 B1 | 12/2005 | Levanoni et al. | |
| 7,130,807 B1 | 10/2006 | Mikurak | |
| 7,222,085 B2 | 5/2007 | Stack | |
| 2004/0034555 A1 | 2/2004 | Dismukes et al. | |
| 2004/0039736 A1 | 2/2004 | Kilmer et al. | |
| 2004/0117239 A1 | 6/2004 | Mittal et al. | |
| 2005/0039107 A1 | 2/2005 | Hander et al. | |

(Continued)

FOREIGN PATENT DOCUMENTS

JP  2002538545  11/2002

(Continued)

OTHER PUBLICATIONS

International Searching Authority, International Search Report and Written Opinion issued in PCT/US2009/032656, mailed Jul. 12, 2011, 8 pages.

(Continued)

*Primary Examiner* — Amee A Shah
(74) *Attorney, Agent, or Firm* — Hanley, Flight & Zimmerman, LLC

(57) ABSTRACT

Methods and apparatus to generate smart text are disclosed. An example computer implemented method includes receiving at an input module a query input associated with at least one of a product of interest or a market of interest during a time-frame of interest and identifying at least one candidate external application based on the query input. The example method also includes retrieving volume information from the at least one candidate external application, the retrieved volume information associated with a current time-frame and the time-frame of interest, calculating a change associated with the retrieved volume information, and assigning a market change descriptor to the at least one of the product of interest or the market of interest related to a magnitude of the calculated change, the assigned market change descriptor output to a user via an output module.

35 Claims, 8 Drawing Sheets

U.S. PATENT DOCUMENTS

| | | | |
|---|---|---|---|
| 2006/0080368 A1 | 4/2006 | Orumchian et al. | |
| 2006/0085255 A1 | 4/2006 | Hastings et al. | |
| 2006/0265302 A1 | 11/2006 | Schmalenberger et al. | |
| 2007/0094066 A1 | 4/2007 | Kumar et al. | |
| 2007/0094067 A1 | 4/2007 | Kumar et al. | |
| 2007/0100680 A1 | 5/2007 | Kumar et al. | |

FOREIGN PATENT DOCUMENTS

| | | |
|---|---|---|
| WO | 0155884 | 8/2001 |
| WO | 03059738 | 7/2003 |

OTHER PUBLICATIONS

Scottrade SmartText, Internet article, 2007, 2 pages.

Scottrade Releases SmartText Analyzer, internet article, Nov. 14, 2007, 5 pages.

Japanese Patent Office, "Office Action," with redacted English translation, issued in connection with Japanese application serial No. 2010-545208, issued May 29, 2012, 9 pages.

Divakar, Suresh et al., "CHAN4CAST: A Multichannel, Multiregion Sales Forecasting Model and Decision Support System for Consumer Packaged Goods," Marketing Science, vol. 24, No. 3, Summer 2005, 19 pages.

Pauwels, Koen et al., "Performance Regimes and Marketing Policy Shifts," Marketing Science, vol. 26, No. 3, May-Jun. 2007, 21 pages.

Acnielsen, "ACNielsen Launches Expanded Capabilities for its ACNielsen Answers(TM) Platform; "One Click, One Place, All the Answers." Details Industry's Most Complete Collection of Integrated Global Application at Consumer 360 Conference", Business Wire, May 16, 2006, 4 pages.

\* cited by examiner

METHODS AND APPARATUS TO GENERATE A SMART TEXT MARKET CHANGE DESCRIPTOR

RELATED APPLICATIONS

This patent claims the benefit of U.S. provisional application Ser. No. 61/025,147, filed on Jan. 31, 2008, which is hereby incorporated by reference herein in its entirety.

FIELD OF THE DISCLOSURE

This disclosure relates generally to market research and business intelligence and, more particularly, to methods and apparatus to generate smart text.

BACKGROUND

Individuals and/or organizations that are chartered with the responsibility to study one or more markets typically enjoy a vast amount of market data on which strategic decisions may be based. Such data may be located in any number of local, regional, and/or global databases to provide information related to demographics, purchasing behavior, sales figures, seasonal sales influences, and/or sales promotion activities. Market researchers and category development professionals may also have access to one or more business applications that process such market data in a particular manner to facilitate an understanding of certain market activities.

Each business application may be directed to a focused aspect of the market and employ one or more analysis methods to market data that yields, for example, market summary data related to one or more specific facets of the market of interest, a product of interest within the market, and/or a service of interest. In other words, each business application typically executes one or more tailored methods to acquire market data and apply one or more analysis techniques to the data to yield one or more results related to a business facet of interest to the market researcher.

However, the number of available databases containing market information is typically large, and a corresponding large number of business applications exist to process such market information to yield one or more particular results. The number of disparate data sources and applications may become overwhelming for a market researcher who, prior to obtaining market result(s) from the one or more applications, may require significant research efforts and/or studying of the applications to become familiar with their associated capabilities, strengths, and/or weaknesses.

DETAILED DESCRIPTION

Figure 1:
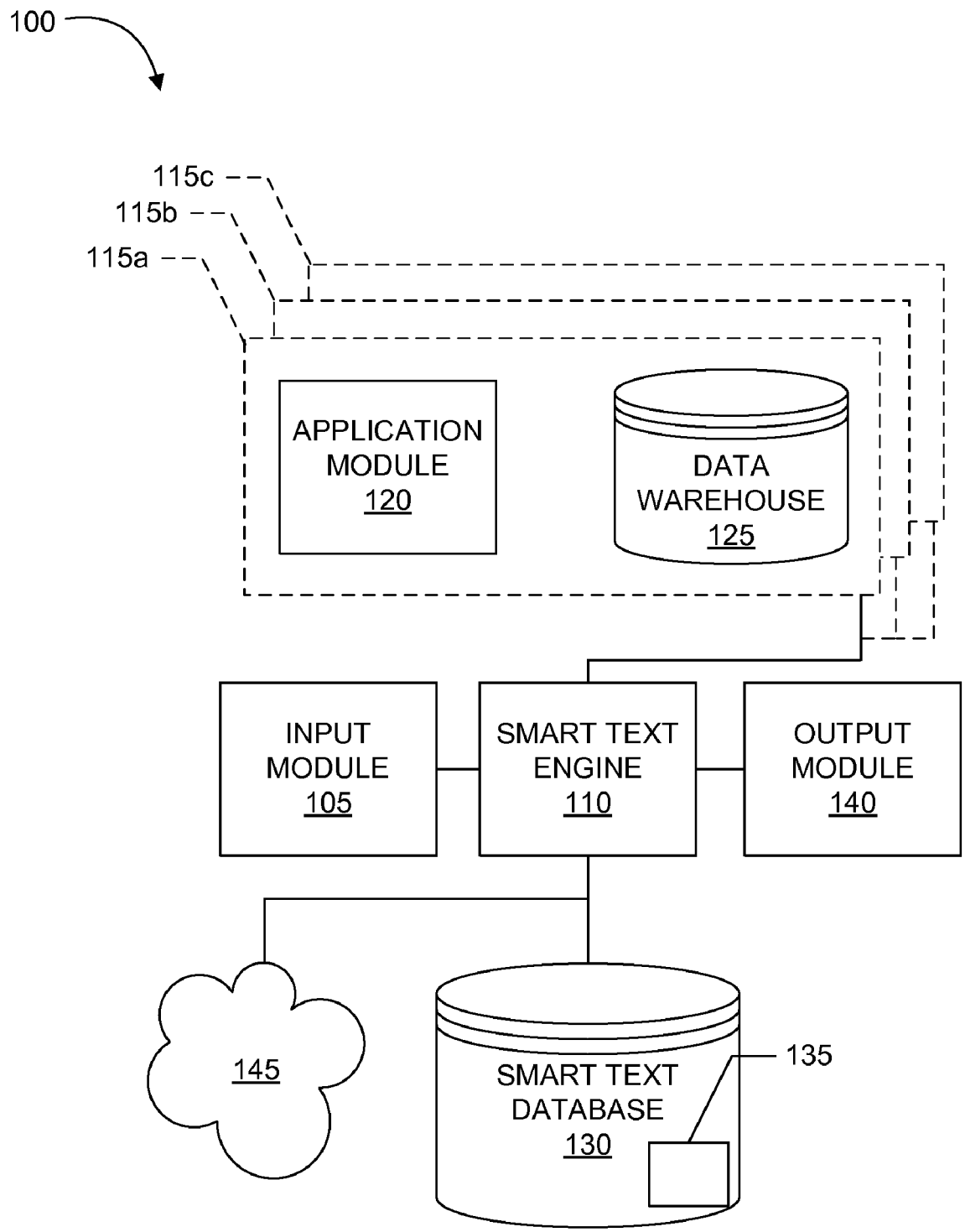
FIG. 1 is a schematic illustration of an example system to generate smart text.

Market researchers typically rely on relatively large numbers of behavioral datapoints when formulating one or more market predictions. Generally speaking, as the number of available datapoints related to a market of interest and/or a product of interest increases, the confidence in the market predictions based on such datapoints increases. Additionally, numerous business applications exist to process the available market datapoints to yield information and/or results that allow the market researcher to make one or more conclusions about the market. Applications may include, but are not limited to, key-performance-indicator (KPI) applications, workflow analysis applications, applications to analyze cause-and-effect (e.g., why sales increased/dropped by a certain percentage), applications that simulate or forecast market trends and/or packaged applications to incorporate databases, presentation applications, customer relationship management (CRM) task applications, product lifecycle management (PLM) analysis applications, and/or supply chain management (SCM) analysis (e.g., SAP®) applications.

Without limitation, applications may also include service oriented architectures (SOAs), which are software architectures that enable use of loosely coupled software services/applications to support one or more requirements of, for example, a business and/or disjoint processes. Such applications are typically resources on a network (e.g., an intranet and/or the Internet) that may be made available as independent services to users. However, these resources may be made available via other non-networked approaches. The users may include, but are not limited to, users within a single corporate entity or enterprise and/or users that operate within contract parameters to access and/or use the application(s). To implement such an SOA, software developers may construct a portal (e.g., an interface for consuming various services/applications) that utilizes or provides access to one or more other applications, thereby allowing the user(s) to retrieve results (e.g., based on queries). The applications invoked by the users may operate in a transparent manner such that, for example, the users may not know and/or care that the invoked applications are external to their organization.

As the number of applications to analyze market datapoints increases, the market researcher is typically required to maintain a current understanding of the particular capabilities of each application. Understanding the capabilities of each application may include gaining insight into one or more strength(s) of the application(s), weakness(es) of the application(s), and/or area(s) of specialization that the one or more application(s) facilitate. Maintaining an understanding of all such facets of the one or more application(s) may consume significant amounts of the market researcher's time, thereby distracting the market researcher from one or more business objectives related to market decision-making. Additionally, some market researchers that seek help from the one or more applications are involved in differing business roles such as, but not limited to, sales, supply, branding, and/or executive-level decision makers. For example, the market researcher involved in sales may be primarily focused on consumption, share, and/or promotion metrics, while the market researcher involved in branding may be more concerned with metrics related to promotions, distribution, and/or pricing. Executive-level decision makers, on the other hand, are typically chartered with a higher overall responsibility and rely on receiving reliable and/or current summary-level details. As such, the executive-level decision maker may have even less available time to keep current with the many business applications capable of providing such information.

The example methods and apparatus described herein enable, in part, a market researcher to receive summary and/or analyzed information from one or more business applications without requiring the market researcher to have intimate knowledge of which application(s) generated such summary and/or analyzed information. In particular, the methods and apparatus described herein receive query information from the market researcher, access one or more business applications (internal applications, external applications, or both) to receive analyzed and/or summarized result information, and present such information to the market researcher as smart text without inundating the market researcher with details related to which application(s) are responsible for the informational results. After the market researcher is provided with one or more results, the apparatus and methods described herein allow more detailed analysis of the information, if desired, by way of suggested action(s) and/or next steps.

FIG. 1 is a schematic illustration of an example system 100 to generate smart text. In the illustrated example of FIG. 1, an input module 105 receives one or more inputs from a user, such as a market researcher, related to a market of interest, a product of interest, and/or a time-frame of interest. The example input module 105 of FIG. 1 may use any display technologies to receive user input such as, but not limited to, a graphical user interface (GUI), a kiosk, and/or web-based services to render an interactive GUI for the user(s). Inputs from the example input module 105 of FIG. 1 are further received by a smart text engine 110 that, among other things, processes a combination of the user input(s) to generate one or more Smart Text sentences.

As described in further detail below, the example smart text engine 110 is communicatively connected to one or more external applications 115a-c. In the illustrated example of FIG. 1, the external applications 115a-c include an application module 120 and a corresponding data warehouse 125. Each of the external applications 115a-c typically provides value to one or more market researchers due to, in part, an industry niche and/or specialized manner of data collection and/or analysis. In some examples, the application module 120 of the external application 115a may include the Homescan™ system, which employs a panelist based methodology to measure consumer behavior and identify sales trends. In the Homescan™ system, households, which together are statistically representative of a demographic composition of a population to be measured, are retained as panelists. These panelists are provided with home scanning equipment and agree to use that equipment to identify, and/or otherwise scan a Universal Product Code (UPC) of every product that they purchase, and to note the identity of the wholesaler, retailer, or other entity from which the corresponding purchase was made. Such purchase-related data may be stored in one or more databases/data warehouses, such as the example data warehouse 125 of FIG. 1.

Other external applications 115a-c may also be communicatively connected to the smart text engine 110 such as, for example, market segmentation applications/services by Claritas™. The Claritas™ services provide information related to geographic regions of interest and market segmentation. In other examples, the external applications 115a-c may include merchant categorization applications, such as the TDLinks™ system. In the TDLinks™ system, the data that is tracked and stored is related to, in part, a merchant store parent company, the parent company marketing group(s), the number of store(s) in operation, the number of employee(s) per store, the geographic address and/or phone number of the store(s), and the channel(s) serviced by the store(s).

While the aforementioned examples of Claritas™, TDLinks™, and Homescan™ systems are described above, the market researcher can select from many other existing business applications and/or applications that are under development. On the other hand, in the event that the market researcher does not have time to stay abreast of the current and/or future applications available for analysis of the one or more input parameters (e.g., a market of interest, a product of interest, etc.), the example methods and apparatus described herein provide human-readable summary and/or result information related to a query without requiring a detailed understanding from where and/or how the information is derived.

In the illustrated example of FIG. 1, the smart text engine 110 is also communicatively connected to a smart text database 130 that includes, in part, one or more business rule(s), business logic, one or more sentence template(s), and one or more internal application(s) 135. In operation, the example smart text engine 110 retrieves one or more results and/or reports from the external applications 115a-c and queries the smart text database 130 for business logic to generate one or more smart text sentences. Such business logic may include, but is not limited to, one or more methods to: determine whether sales results are greater than or less than a previous time period; determine whether sales results are due to baseline metrics; determine whether sales results are due to incremental metrics; and/or select language to communicate an indication of severity of volume change (e.g., "volume increased," "volume increased significantly," "volume decreased slightly," etc.).

After the smart text engine 110 receives the input(s) from the input module 105, retrieves market data from the one or more external applications 115a-c and/or the one or more internal applications 135, and applies the business logic and/or rule(s) from the smart text database 130, the smart text engine 110 provides the generated smart text sentence(s) to the output module 140, as discussed in further detail below. Similar to the example input module 105, the output module 140 may employ any display technologies to provide smart text output sentence(s) such as, but not limited to, a GUI, a kiosk, and/or web-based services to render an output GUI for the user(s). The smart text output sentence(s) may be saved in any suitable file-format, such as a text (.txt) file that, in some examples, is downloaded and parsed by a reporting application to render one or more output report(s). For example, the example smart text engine 110 may operatively connect with one or more networks 145 to receive requests to generate smart text. In some examples, the smart text engine 110 is communicatively connected, via the network 145, to a reach through manager that, in part, facilitates connectivity with one or more external applications and/or services. Generally speaking, the reach through manager may operate in a manner that is transparent to the user, such that requesting, building, and/or receiving information is achieved as if the application(s) were locally available. An example of such a reach through manager is disclosed in U.S. Provisional Patent Application Ser. No. 60/889,701, filed on Feb. 13, 2007, and U.S. Patent Publication no. 2008-0263436, which are specifically incorporated by reference herein in their entireties.

Figure 2:
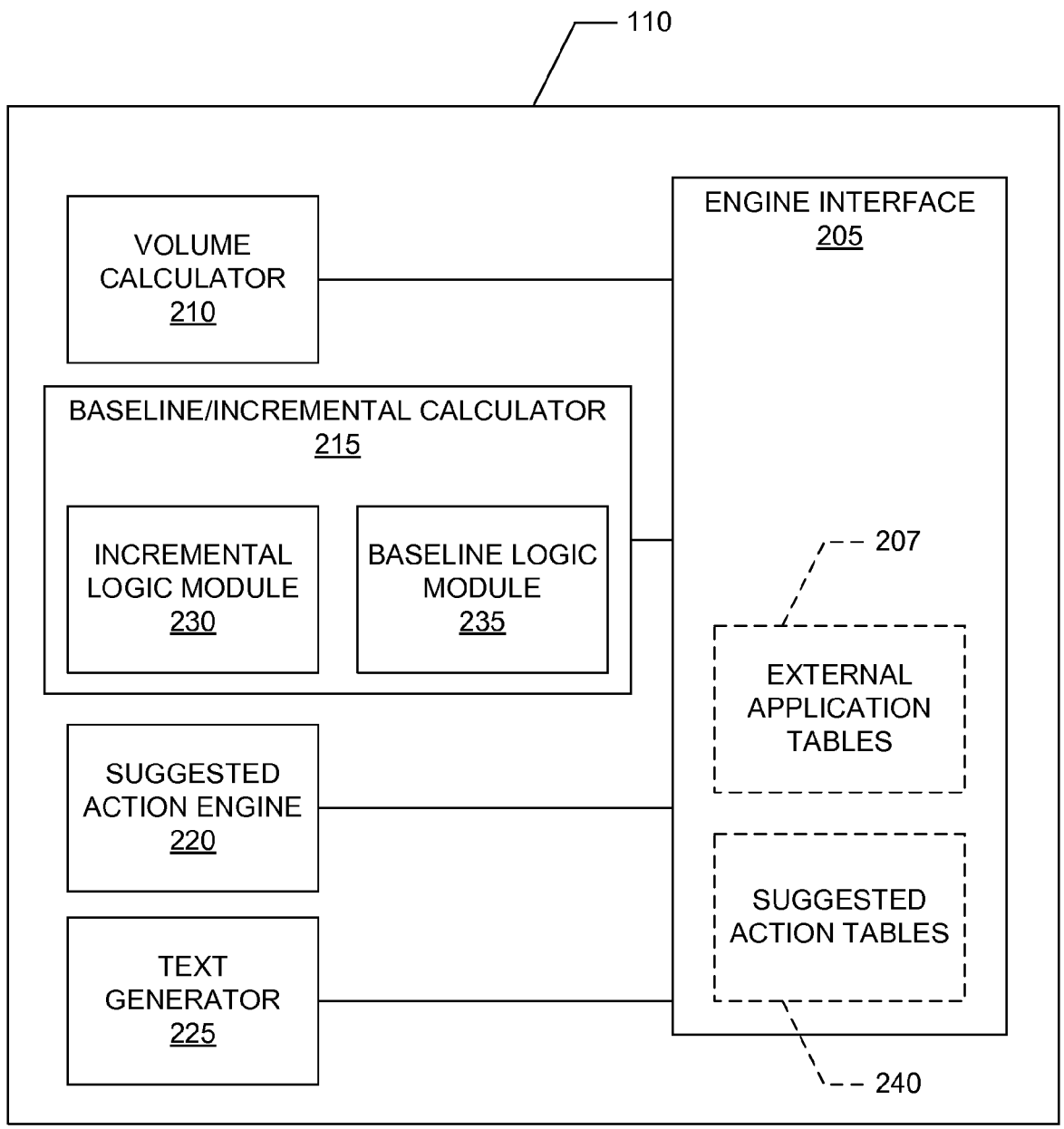
FIG. 2 is a more detailed schematic illustration of a smart text engine of FIG. 1.

FIG. 2 is a more detailed schematic illustration of the example smart text engine 110 of FIG. 1. In the illustrated example of FIG. 2, the smart text engine 110 includes an engine interface 205 to facilitate communication between the smart text engine 110 and the input module 105, the one or more external applications 115a-c, the smart text database 130, the internal application(s) 135, the output module 140, and/or the network 145. The example network 145 may include an intranet, a wide area network, and/or the Internet. Additionally, the example smart text engine 110 includes a volume calculator 210, a baseline/incremental calculator 215, a suggested action engine 220, and a text generator 225. The example baseline/incremental calculator 215 further includes an incremental logic module 230 to execute, in part, promoted pricing logic and effectiveness logic. The example baseline/incremental calculator 215 also includes a baseline logic module 235 to execute, in part, regular pricing logic, distribution logic, and/or velocity logic, as described in further detail below.

In operation, the example engine interface 205 receives one or more inputs (input parameters) from the user. As described above, example inputs may include, but are not limited to, information indicative of a market of interest, a product of interest, and/or a time-frame of interest. The market of interest may include a geographic identifier, such as a city, a county, a state, and/or a region of a country. Additionally, the geographic identifier may specify a geographic identifier combined with a retail identifier such as, for example, "Publix® Miami," which identifies one or more Publix® supermarket retail stores within the Miami region or locality. Such geographic identifiers serve to, in part, identify which of the external applications 115a-c are available in response to a query initiated by a user. For example, in view of the numerous external applications 115a-c available to the system 100 to generate smart text, the identifier related to one or more geographic and/or market localities constrains which one or more of the external applications 115a-c are employed during the query. In other words, if one particular external application does not contain any data related to the geographic identifier of interest, then the smart text engine 110 will exclude such external application(s) from further consideration during subsequent queries within the identified geography of interest.

To further constrain which of the one or more external application(s) 115a-c are candidates for the query, the example engine interface 205 receives a product of interest and a time-frame of interest from the input module 105. Similar to the geographic identifier of interest, if one or more of the external application(s) fail to include the identified product of interest and/or fail to contain data related to the time-frame of interest, then the example smart text engine 110 will not consider such external application(s) during further queries. To generate smart text, the user of the system 100 need not have any understanding of the available external application(s) 115a-c and/or particular strengths, weaknesses, and/or specialties of the external application(s) 115a-c. However, the example engine interface 205 includes one or more tables 207 to identify external application candidate(s) based on the input parameters provided by the user. In the illustrated example of FIG. 2, the engine interface 205 compares the input parameters with one or more of the external application(s) 115a-c as identified in the external application tables 207, to determine which one or more external applications are suitable for participation in the query. Additionally, the engine interface 205 may include best practices and/or weighting factor(s) to identify one or more particular ones of the external application(s) 115a-c that are better suited to participate in the query. For example, some of the external application(s) 115a-c and/or data warehouses may be unique to a particular geographic region and include a demographic representation that is superior to a national external application. Such best practices, weighting factor(s), external application table(s), and/or other factors to facilitate selection of one or more of the external application(s) 115a-c may be configured and/or maintained by a system administrator chartered with the responsibility of keeping abreast of all candidate external application(s).

Based on the one or more external application(s) 115a-c that are selected by the engine interface 205 (e.g., via one or more queries to the example external application table 207), the example volume calculator 210 directs the engine interface 205 to extract from the one or more external application (s) 115a-c data that is indicative of the input parameters. For example, the volume calculator 210 queries the one or more relevant external application(s) 115a-c to receive information that identifies a current volume for the identified product of interest within the identified market of interest. Additionally, after querying the one or more relevant external application (s) 115a-c, the volume calculator 210 receives information that identifies a volume specific to the time-frame of interest so that an overall volume sentence may be generated. In other words, to begin to determine how the identified product of interest has changed during the time-frame of interest, the volume calculator 210 receives historic volume information from one or more time periods prior to the time-frame of interest and/or current product volume information.

Figure 3A:
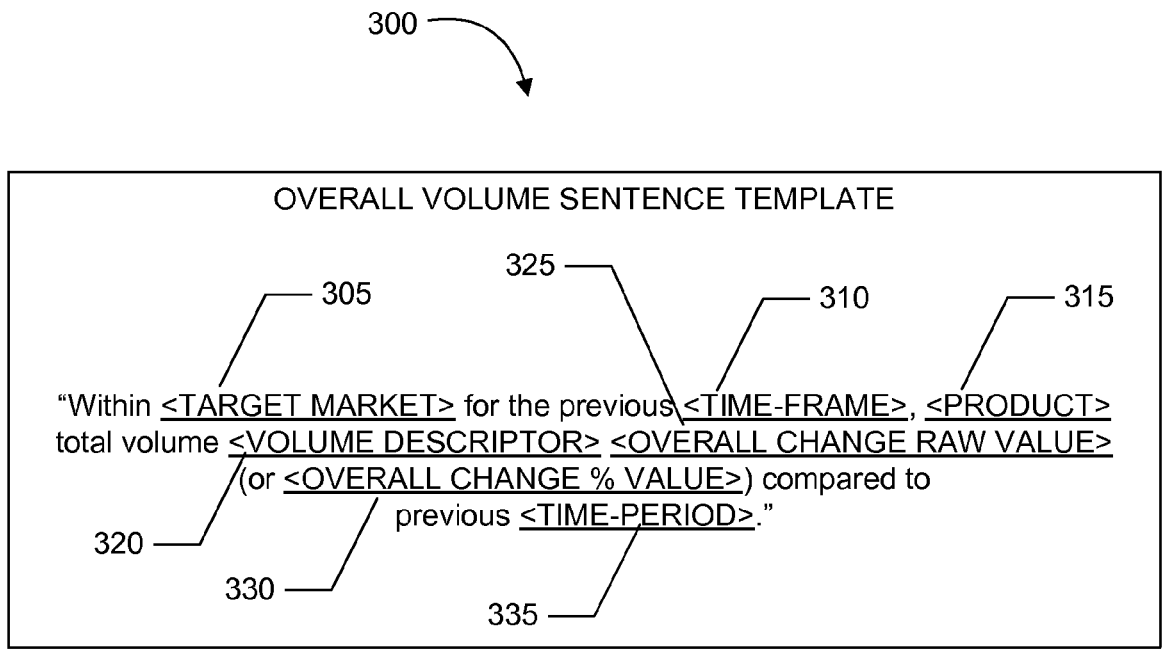
FIGS. 3A and 3B are example smart text sentences to communicate overall volume.

After the example volume calculator 210 receives current product volume information, historic volume information, and/or volume information associated with the time-frame of interest, the difference between these volumes are calculated, such as the difference between raw numbers and percentages. Calculated values are provided to the example text generator 225, which retrieves a template sentence from the smart text database 130. FIG. 3A depicts an example template for an overall volume sentence 300. In the illustrated example of FIG. 3A, the overall volume sentence 300 includes a plurality of customization fields including, but not limited to a target market field 305, a time-frame field 310, a product of interest field 315, a volume change descriptor field 320, an overall change raw value field 325, an overall change percentage value field 330, and a previous time-period field 335. In operation, the example text generator 225 inserts the input parameters provided by the user and data returned from the example volume calculator 210 to generate/construct a human readable smart text sentence, such as the example smart text overall volume sentence shown in FIG. 3B. In the illustrated example of FIG. 3B, the user input associated with the market of interest is "Publix® Miami," the time-frame of interest is "52-weeks" and the product of interest is "Cheerios® 15 oz." Each of the input parameters is inserted into the target market field 305, the time-frame of interest field 310, and the product of interest field 315, respectively.

Additionally, the example text generator 225 (FIG. 2) inserts the received calculated values from the volume calculator 210 to populate the volume change descriptor field 320, the overall change raw value field 325, and the overall change percentage field 330. More specifically, the example text generator 225 determines appropriate volume change descriptor language based on business logic that may be stored in the smart text database 130 (FIG. 1). For example, the smart text database 130 may include logic to select one of three phrases for the volume change descriptor field 320: "increased/decreased slightly;" "increased/decreased;" and "increased/decreased significantly." In some examples, the logic calculates an absolute value of the percent change of volume and assigns an appropriate phrase based on whether the change is less than 5%, between 5% and 15%, or greater than 15%. For example, an absolute value of a volume change seeks to identify the volume change regardless of whether such volume has increased or decreased relative to any given startpoint. In the event a prior time-period (e.g., a prior month) sales volume was 100-units, then a current time-period (e.g., a current month) sales volume of either 150-units or 50-units would result in the same magnitude change in sales volume.

Figure 3B:
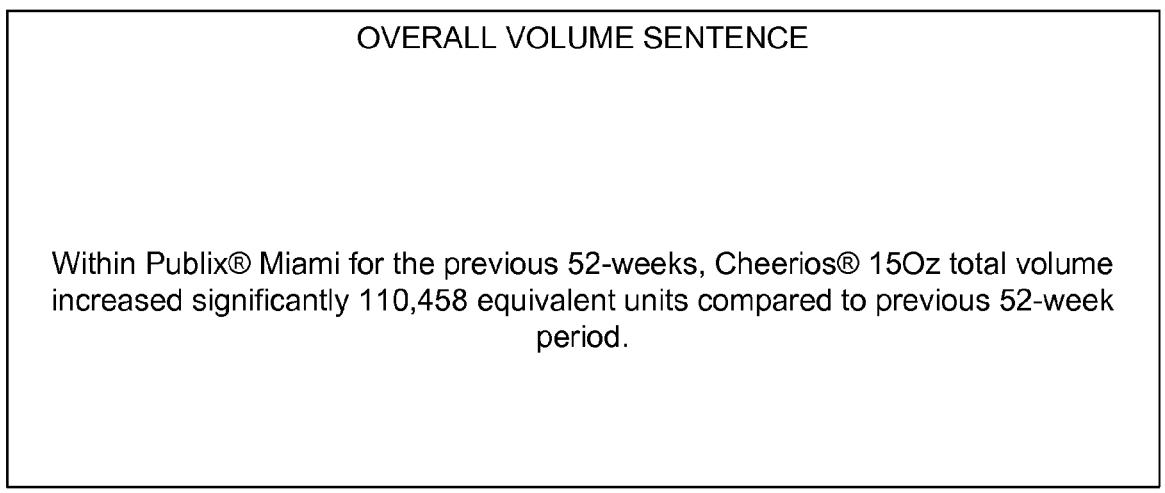

FIG. 3B is an example generated smart text overall volume sentence after the text generator 225 has inserted phrases and data into the respective fields (e.g., the target market field 305, the time-frame of interest field 310, the product of interest field 315, the volume change descriptor field 320, the overall change raw value field 325, the overall change percent value field 330, and the previous time-period field 335). In the illustrated example of FIG. 3B, the smart text engine 110 presents the user with the overall volume sentence, which contains information related to what has happened for the product of interest in the associated market of interest for the selected time-frame of interest. However, the example smart text engine 110 also generates/constructs additional smart text sentences and/or paragraphs to provide the user with additional information related to why such changes may have occurred. In particular, the example baseline/incremental calculator 215 accesses the one or more external application(s) 115a-c to ascertain whether the identified volume changes are due to baseline metrics, incremental metrics, and/or a combination of both baseline and incremental metrics.

Generally speaking, baseline factors/metrics include standard price-points and seasonal influences, which affect a quantity of units sold in a market of interest. On the other hand, incremental factors/metrics consider the effect of promotional activity, such as running newspaper advertisements, television advertisements, and/or dropping the price of the product of interest. When a product volume changes, either an increase in volume or a decrease in volume, market researchers typically prefer to gain further insight on whether such increases and/or decreases are due to one or more metrics associated with baseline and/or incremental factors. Volume changes may occur in situations where the volume related to both the baseline and incremental metrics contribute to the overall volume change. On the other hand, the overall volume change may include circumstances in which one or the other of the baseline or incremental metrics change in a direction opposite to that of the overall volume change (e.g., an overall positive change in a volume of products sold is 100, in which the incremental metrics contributed to 125 of those products, while the baseline metrics illustrate 25 fewer products were sold).

The baseline/incremental calculator 215 of FIG. 2 determines a composition of the overall volume change. In particular, the baseline/incremental calculator 215 accesses the one or more external application(s) 115a-c via the engine interface 205 to retrieve additional details relating to the overall volume determined by the volume calculator 210. The example baseline/incremental calculator 215 retrieves sales volume changes associated with standard price-points and seasonal expectations from the one or more external application(s) 115a-c, which are changes indicative of the baseline metrics. In some examples, the returned baseline metrics indicate a volume change (magnitude), a direction of volume change (direction), and/or a rate of volume change. Similarly, the baseline/incremental calculator 215 retrieves sales volume changes associated with promotional activities from the one or more external application(s) 115a-c, which are changes indicative of the incremental metrics.

In operation, and as described in further detail below, determining the composition of the overall volume change includes first calculating whether the baseline and incremental volume changes are in the same direction as the overall volume change. If so, then the example baseline/incremental calculator 215 applies one or more threshold tests to determine whether the baseline or the incremental volume change was more significant. For example, the threshold test employed by the example baseline/incremental calculator 215 may determine whether the baseline volume change was greater than 70% of the overall volume change, thereby indicating that the incremental change can be no larger than 30% of the overall volume change. In the aforementioned example, the baseline volume was the largest contributor to the overall volume change and the smart text engine 110 generates a smart text largest contributor sentence to explain such detail. On the other hand, if the baseline volume change was not greater than the threshold (e.g., 70%), then the example smart text engine 110 generates a smart text dual contribution sentence.

Figure 4A:
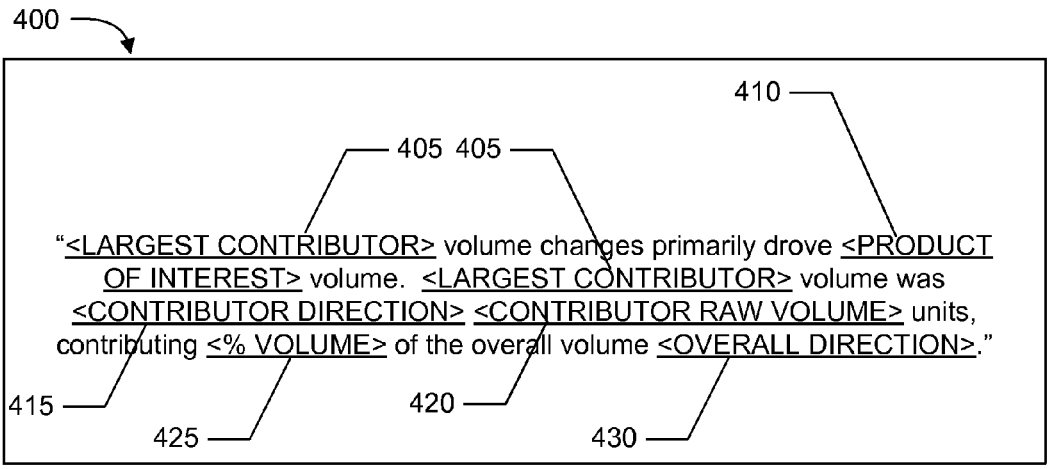
FIGS. 4A through 4D are example smart text sentences to communicate baseline and/or incremental metrics related to the overall volume.
Figure 4B:
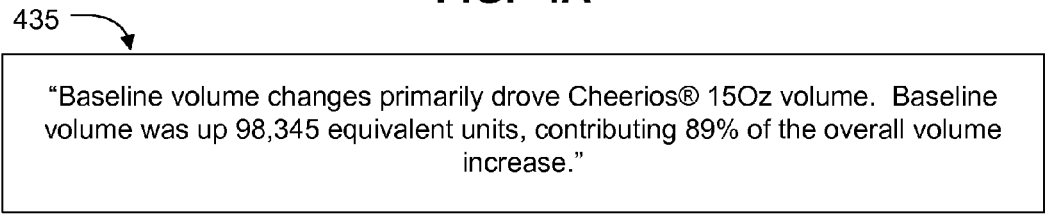

FIG. 4A is an example smart text largest contributor sentence template 400 generated by the smart text engine 110. In particular, based on the volume data retrieved from the one or more external application(s) 115a-c, the baseline/incremental calculator 215 invokes the text generator 225 to retrieve the largest contributor sentence template 400. In the illustrated example of FIG. 4A, the template includes a largest contributor type field 405 (e.g., "baseline," or "incremental"), a product of interest field 410, a contributor direction field 415, a contributor raw volume field 420, a contributor percentage field 425, and an overall volume direction field 430. Each of the fields 410-430 is populated by the example text generator 225 based on the information provided by the example baseline/incremental calculator 215 to yield a populated largest contributor smart text sentence 435, as shown in FIG. 4B.

Figure 4C:
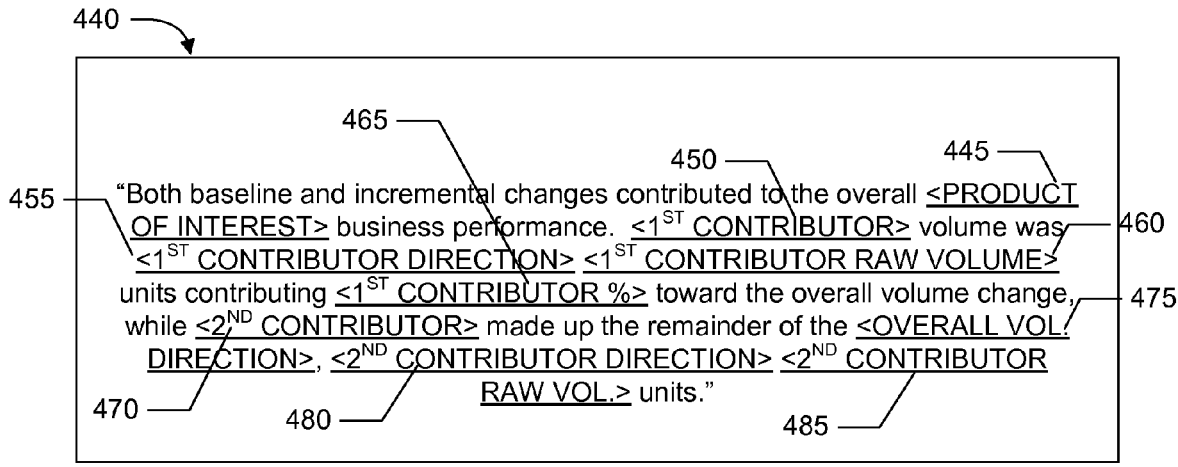

On the other hand, in the event that one or more thresholds indicate that neither the baseline volume nor the incremental volume changes were a largest contributor, the example baseline/incremental calculator 215 invokes the text generator 225 to generate a dual contribution smart text sentence template 440, as shown in FIG. 4C. In the illustrated example template 440 of FIG. 4C, the smart text sentence includes a product of interest field 445, a first contributor field 450 (e.g., either "baseline" or "incremental"), a first contributor direction field 455 (e.g., "up," "down"), a first contributor raw volume field 460, a first contributor percentage field 465, a second contributor field 470 (e.g., the opposite of the first contributor field), an overall volume direction field 475, a second contributor direction field 480, and a second contributor raw volume field 485. Each of the fields 445-485 in the example dual contribution template 440 is populated by the example text generator 225 based on the information provided by the example baseline/incremental calculator 215 to yield a dual contribution smart text sentence 490 such as that shown in FIG. 4D.

After determining whether baseline metrics, incremental metrics, both baseline and incremental metrics contributed to the overall volume change, and/or whether each of the metrics moved in the same or opposite direction of the overall volume change, the example baseline/incremental calculator 215 employs the incremental logic module 230 and/or the baseline logic module 235 to drill-down the query with further detail(s) to explain why such changes have occurred. In the illustrated example of FIG. 2, the baseline logic module 235 includes, but is not limited to regular pricing logic, distribution logic, breadth logic, depth logic, and/or velocity logic. Additional business logic associated with baseline metrics may be stored in the smart text database 130, the internal application(s) 135, and/or one or more external application(s) 115a-c. Additionally, as new and/or alternate business logic is developed that is deemed valuable to the user, such new and/or alternate business logic may be configured and stored in 130 and/or 135 and/or each of the applications 115a-c by the system administrator for future use.

In one example, the regular pricing logic instructs the engine interface 205 to retrieve market information indicative of the change in the regular price for a product of interest and compare it to a threshold amount. In the event that the example threshold is a dollar amount in excess of $0.05 and a percent change less than 3% in a direction opposite the baseline volume change, then the baseline logic module 235 instructs the text generator 225 to generate a regular pricing smart text template sentence in a manner similar to that described above in view of FIGS. 4A through 4D.

In another example, the incremental logic module 230 includes, but is not limited to promoted pricing logic, effectiveness and quality logic, and/or predominant tactics logic. The promoted pricing logic may employ a threshold to determine whether the promoted price of a product of interest was greater than a dollar amount (e.g., $0.05) and less than a changed percentage amount (e.g., 3%) and, if so, invoke the text generator to generate a corresponding promoted pricing smart text sentence. An example promoted pricing sentence may recite, "On average, promotions for Cheerios® 15 oz were priced at $1.92 per unit. This is down $0.13 versus the comparison period, in which Cheerios® 15 oz were priced at $2.05."

In a manner similar to the example baseline logic module 235 described above, new and/or alternate business logic may be employed by the incremental logic module 230 as it is developed and/or modified. Such business logic may be stored in any location including, but not limited to, the smart text database 130, the internal application(s) 135, and/or the external application(s) 115a-c. Upon completion of market analysis via the business logic and the one or more external application(s) 115a-c with which the business logic operates, the example smart text engine 110 invokes the suggested action engine 220 to allow the user to review one or more analysis suggestions. For example, after the user is presented with one or more smart text sentences related to the overall volume, the largest contributor, dual contributor, and/or smart text sentences specific to baseline metrics (e.g., regular pricing logic, distribution logic, base velocity logic, etc.) and/or incremental metrics (e.g., promoted pricing logic, effectiveness/quality logic, etc.), the suggested action engine 220 presents one or more suggested actions from which the user may select.

In one example, after the smart text engine 110 determines that incremental metrics contribute the most to the overall volume increase/decrease, then the suggested action may indicate, "What promotions are driving category and segment growth?" On the other hand, if the smart text engine 110 determines that baseline metrics contribute the most to the overall volume increase/decrease, then the suggested action may indicate, "How have channel dynamics changed over time?" The example suggested actions are not limited to circumstances after the largest contributor(s) is/are determined, but may also be presented to the user after the baseline and/or incremental logic is executed by the example baseline/incremental calculator 215. For example, after business logic related to promoted pricing is executed, the suggested action engine 220 may state, "How does my discount level compare to competitor discount level(s)?"

The suggested actions provided to the user may operate as functional links to invoke one or more external and/or internal applications, such as the example external applications 115a-c and the internal application 135. For example, in response to the user being presented with and selecting the suggested action "How does my discount level compare to competitors?", the example suggested action engine 220 employs the engine interface 205 to invoke the external application that facilitates one or more answers to the selected suggested action. As described above, the reach through manager may operate to facilitate connectivity with one or more external applications.

To determine which of one or more suggested actions to present to the user, the example suggested action engine 220 queries one or more suggested action tables 240 of the engine interface 205. The suggested action tables 240 may be categorized in any manner, such as at a relatively high level including actions related to incremental metrics or actions related to baseline metrics. Without limitation, the example suggested action tables 240 may be more narrowly categorized, such as by actions related to promoted pricing, actions related to effectiveness, actions related to competitive price changes, and/or actions related to baseline distribution metrics.

Figure 5A:
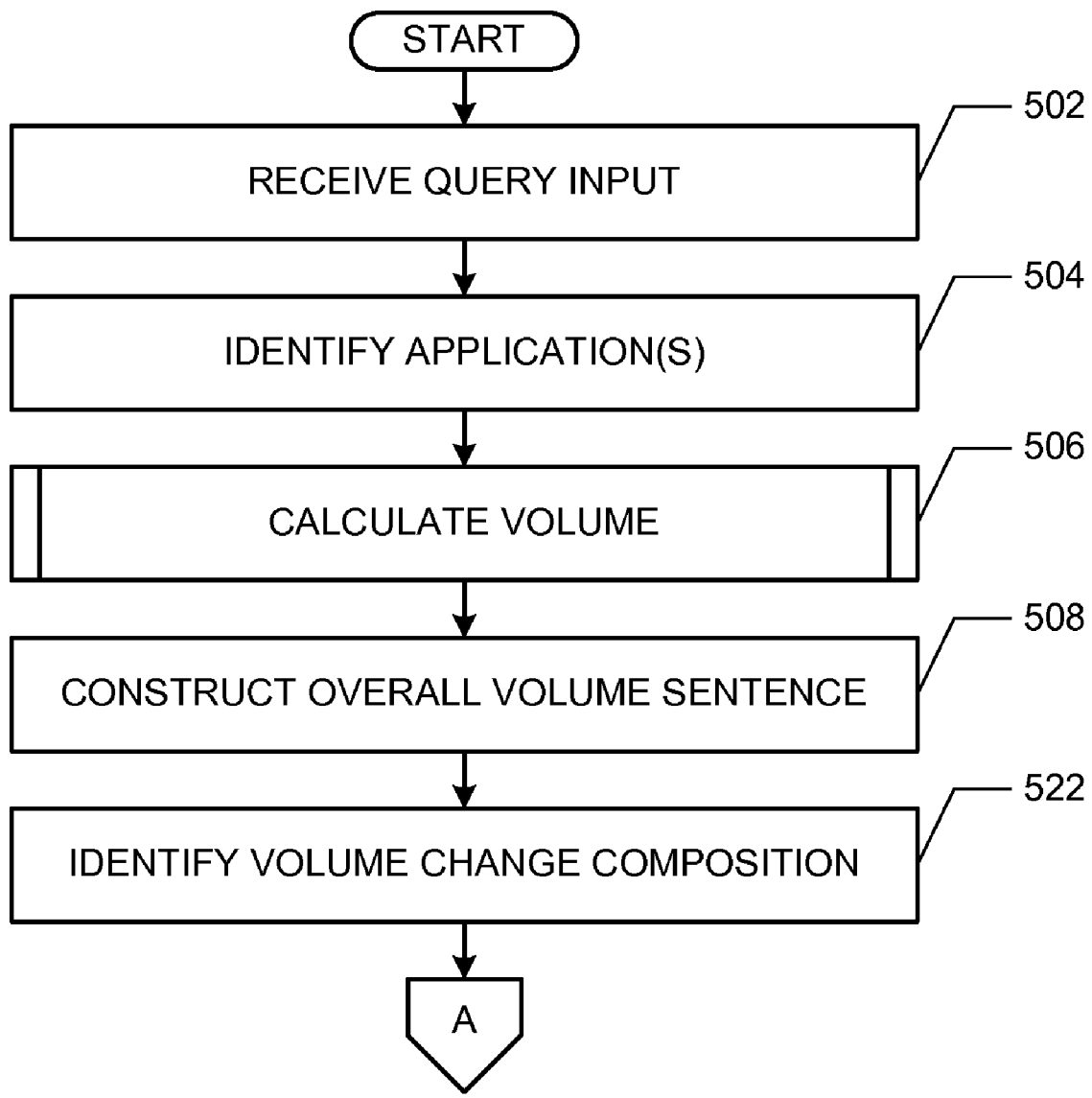
FIGS. 5A through 5C are flowcharts representative of example methods that may be performed by one or more entities of the example system of FIGS. 1 and 2 to generate smart text.
Figure 5B:
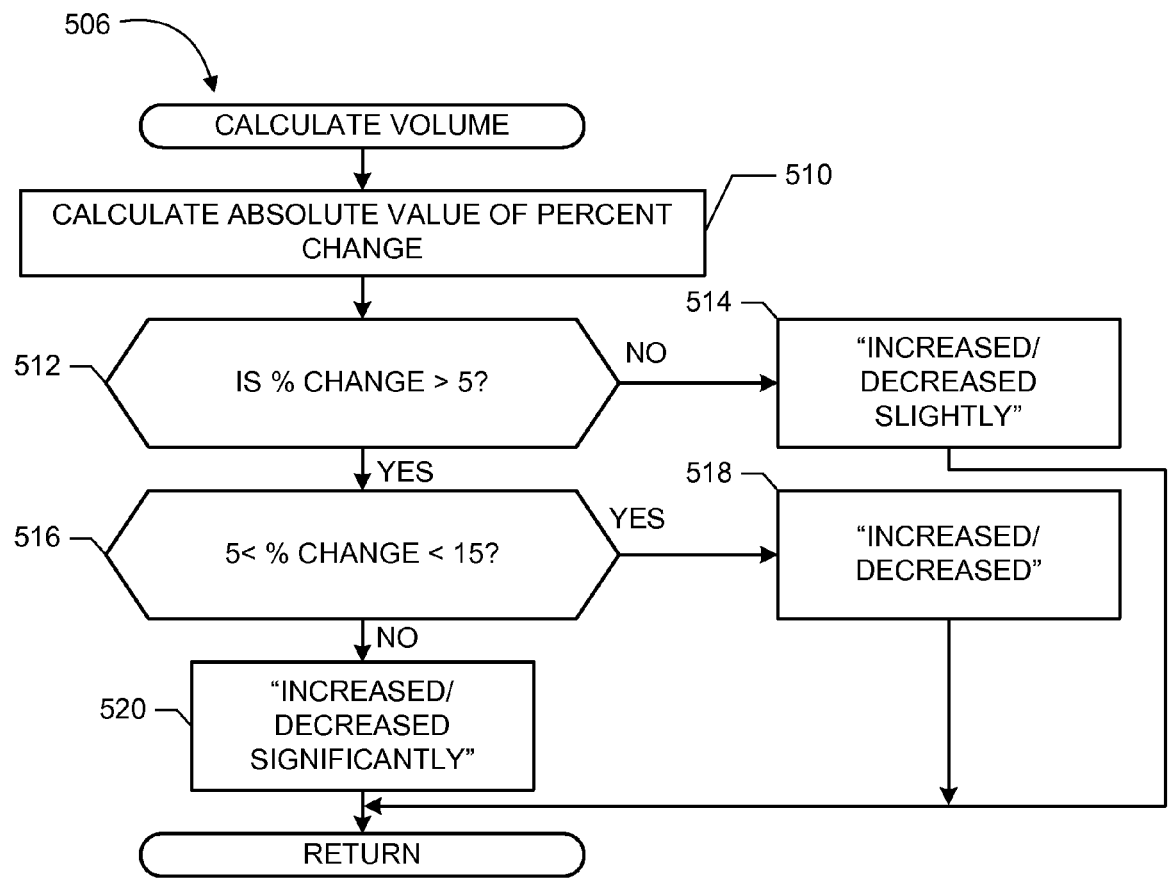
Figure 5C:
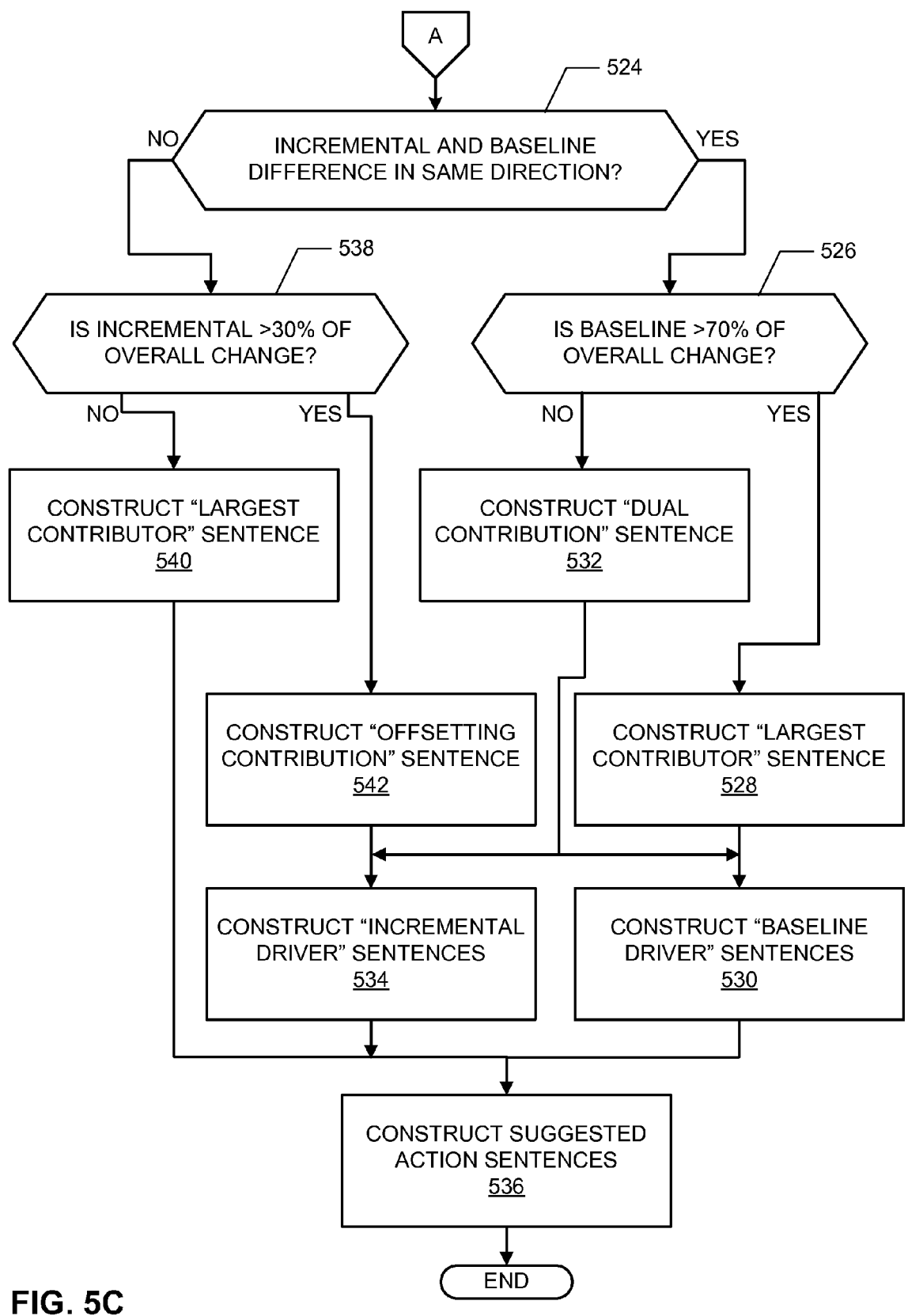

Flowcharts representative of example methods for implementing the system 100 to generate smart text of FIG. 1 and/or the smart text engine 110 of FIGS. 1 and 2 are shown in FIGS. 5A through 5C. In this example, the methods may be implemented using machine readable instructions comprising one or more programs for execution by one or more processors such as the processor 612 shown in the example processor system 610 discussed below in connection with FIG. 6. The program(s) may be embodied in software stored on a tangible medium such as a CD-ROM, a floppy disk, a hard drive, a digital versatile disk (DVD), or a memory associated with the processor 612, but the entire program and/or parts thereof could alternatively be executed by a device other than the processor 612 and/or embodied in firmware or dedicated hardware in. For example, any or all of the input module 105, the smart text engine 110, the external applications 115a-c, the output module 140, the engine interface 205, the volume calculator 210, the baseline/incremental calculator 215, the suggested action engine 220, the text generator 225, the incremental logic module 230, and/or the baseline logic module 235 could be implemented (in whole or in part) by software, hardware, and/or firmware. Further, although the example methods are described with reference to the flowchart illustrated in FIGS. 5A through 5C, many other methods of implementing the example system 100 may alternatively be used. For example, the order of execution of the blocks may be changed, and/or some of the blocks described may be changed, eliminated, or combined.

The methods of FIGS. 5A through 5C begin at block 502 of FIG. 5A where the example smart text engine 110 receives a query input from the user. As described above, the query input may include, but is not limited to, parameters related to a market of interest, a product of interest, and/or a time-frame of interest for which the user desires market analysis. In view of the example input parameters from the user, the smart text engine 110 identifies which of the one or more external application(s) 115a-c is available to satisfy the user's request(s) (block 504). The list of candidates capable of contributing relevant market data and/or market analysis techniques may be determined via one or more queries to the external application tables 207 of the engine interface 205.

Upon identification of which external application(s) 115a-c are appropriate candidates/resources that have capabilities related to the query parameters, the example volume calculator 210 calculates and/or otherwise determines a current volume and/or the volume during or at the time-frame of interest (block 506). The information calculated and/or obtained by the volume calculator 210, such as the target market, the time-frame of interest, the product of interest, the volume change descriptor, the overall change raw value, and/or the overall change percentage value, is provided to the example text generator 225 to generate/construct the overall volume sentence (block 508).

Turning briefly to FIG. 5B, an example method to determine volume change descriptor language is shown. As described above, the volume change descriptor language, such as the volume change descriptor field 320 described above in view of FIG. 3A, may recite, for example, "increased/decreased," "increased/decreased slightly," or "increased/decreased significantly." The example volume calculator 210 calculates an absolute value of percent change of the overall volume (block 510) and compares that change to a first minimum threshold (block 512). In the event that the absolute value of the overall volume is less than the minimum threshold (block 512), the example volume calculator 210 assigns the volume change descriptor field 320 language indicative of only a slight change. For example, if the change was less than a minimum threshold of 5%, then the volume calculator 210 may assign the term "slightly" as a descriptor of relative volume magnitude change (block 514).

On the other hand, if the minimum threshold is exceeded (block 512), then the example volume calculator 210 applies a midrange threshold test (block 516). In the event that the absolute value of the overall volume change is within the midrange threshold value (block 516), then the volume calculator 210 assigns the volume change descriptor to use example language of "increased," or "decreased" absent further descriptors indicative of relative magnitude (block 518). However, if the midrange threshold value is exceeded (block 516), then the volume calculator 210 assigns the volume change descriptor language that is indicative of relatively significant change, such as "increased/decreased significantly" (block 520). While the illustrated example of FIG. 5B employs the example language "increased," "decreased," "increased slightly," "decreased slightly," "increased significantly," and "decreased significantly," any other terms may be employed to convey one or more indications of the change in volume.

After constructing the overall volume sentence (block 508), the example smart text engine 110 identifies additional details related to the volume change composition (block 522). More specifically, the baseline/incremental calculator 215 of the example smart text engine 110 accesses the one or more external application(s) 115a-c via the engine interface 205 to retrieve additional details relating to the overall volume determined by the volume calculator 210. A percentage contribution of baseline metrics that contribute to the overall volume change, and a percentage contribution of incremental metrics that contribute to the overall volume change are determined (block 522). Turning to FIG. 5C, the example baseline/incremental calculator 215 determines whether the incremental and baseline changes are in the same direction as the overall volume change (block 524). For example, if the overall volume change is an increase of 100 units, with 75 units caused by incremental metrics (e.g., a sales promotion), and 25 units caused by baseline metrics (e.g., seasonal sales factors), then both the incremental and baseline added to the bottom-line overall volume change. On the other hand, if the overall volume change is an increase of 100 units, but the seasonal sales factors resulted in a slump of 25 fewer units sold that a previous time-frame, while the sales caused by incremental metrics resulted in 125 units sold, then the incremental and baseline metrics do not act in the same direction to yield the overall volume change.

In the illustrated example of FIG. 5C, in the event that the incremental and baseline metrics contribute in the same direction to the overall volume change (block 524), then the baseline/incremental calculator 215 determines whether the baseline contribution exceeds a threshold value (block 526). For purposes of illustration, and not limitation, the example threshold value for baseline contribution is 70% and, if exceeded (block 526), the baseline/incremental calculator 215 invokes the text generator 225 to construct a largest contributor sentence (block 528), such as the example largest contributor sentence 435 shown in FIG. 4B. Additionally, control advances to the baseline logic module 235 to execute baseline logic in an effort to determine why such volume changes occurred (block 530).

Figure 4D:
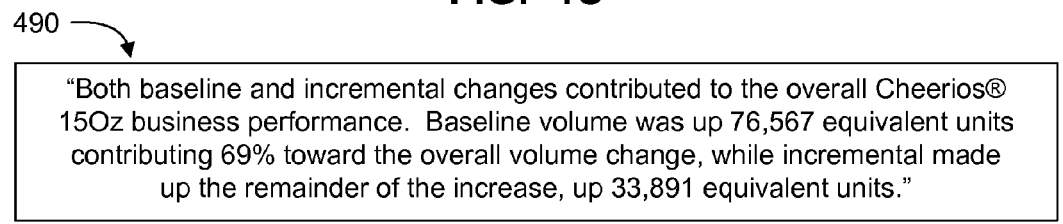

In the event that the baseline or the incremental metrics were not the majority driving force behind an overall volume change (block 526), then the baseline/incremental calculator 215 invokes the text generator 225 to construct a dual contribution sentence (block 532), such as the example dual contribution smart text sentence 490 of FIG. 4D. In this example circumstance, because both the baseline metrics and the incremental metrics contributed to the overall volume change, the baseline logic module 235 and the incremental logic module 230 are invoked to execute both baseline logic and incremental logic (blocks 530 and 534).

In either event, control advances to the suggested action engine 220 to query the suggested action tables 240 of the engine interface 205 to determine which of the one or more suggested action sentences to present to the user in response to the smart text sentence(s) (block 536).

Returning to block 524, in the event that the incremental and baseline metrics did not contribute to the overall volume change in the same direction (e.g., one of the baseline or incremental metrics contributed to the volume change, while the other affected the volume change in the opposite direction), then the example baseline/incremental calculator 215 determines whether, in this example, the incremental metrics contributed to more than 30% of the overall volume change (block 538). If not, then the baseline metrics contributed a greater percentage effect on the overall volume change, and the baseline/incremental calculator 215 invokes the text generator 225 to construct a largest contributor sentence (block 540), such as the example largest contributor smart text sentence 435 of FIG. 4B described above. On the other hand, if the incremental metrics were greater than the example threshold of 30% (block 538), then the baseline/incremental calculator 215 invokes the text generator 225 to construct an offsetting contribution smart text sentence (block 542). While the illustrated example of FIG. 5C identifies an example incremental threshold of 30%, such value is used for example purposes and any other threshold value may be employed.

The example methods and apparatus described herein may be well suited for various business intelligence/logic systems and/or applications. In particular, the example methods and apparatus described herein may enable smart text generation for the ACNielsen Answers® platform, which is a system that, among other things, allows users to obtain and/or process information keyed-to the user's particular business needs. The Answers® platform may also allow the users to investigate causes of measured business results in view of key performance indicators.

Figure 6:
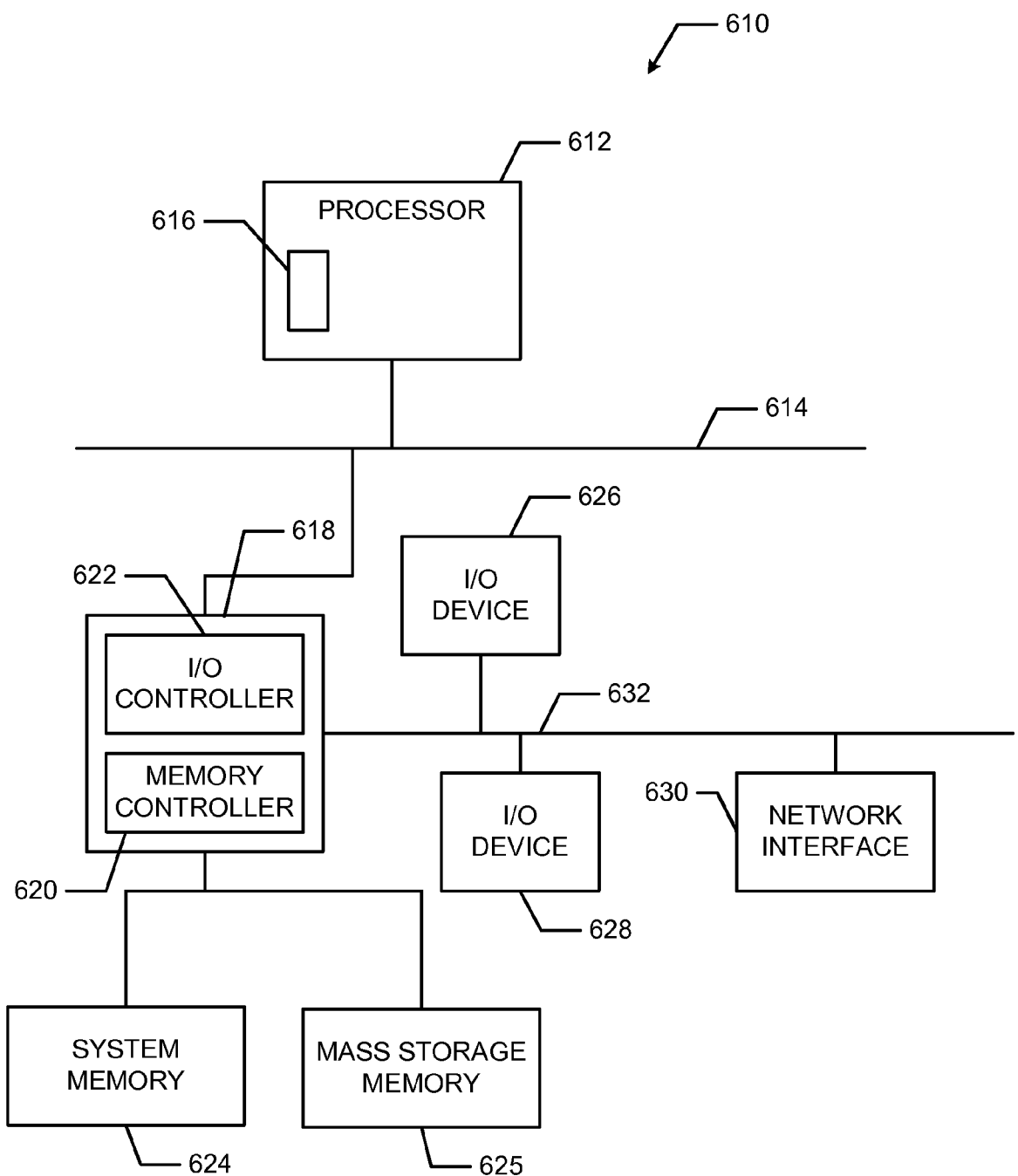
FIG. 6 is a block diagram of an example processor system that may be used to implement the example apparatus and/or methods described herein.

FIG. 6 is a block diagram of an example processor system 610 that may be used to execute the example methods of FIGS. 5A through 5C to implement the example systems, apparatus, and/or methods described herein. As shown in FIG. 6, the processor system 610 includes a processor 612 that is coupled to an interconnection bus 614. The processor 612 includes a register set or register space 616, which is depicted in FIG. 6 as being entirely on-chip, but which could alternatively be located entirely or partially off-chip and directly coupled to the processor 612 via dedicated electrical connections and/or via the interconnection bus 614. The processor 612 may be any suitable processor, processing unit or microprocessor. Although not shown in FIG. 6, the system 610 may be a multi-processor system and, thus, may include one or more additional processors that are identical or similar to the processor 612 and that are communicatively coupled to the interconnection bus 614.

The processor 612 of FIG. 6 is coupled to a chipset 618, which includes a memory controller 620 and an input/output (I/O) controller 622. A chipset typically provides I/O and memory management functions as well as a plurality of general purpose and/or special purpose registers, timers, etc. that are accessible or used by one or more processors coupled to the chipset 618. The memory controller 620 performs functions that enable the processor 612 (or processors if there are multiple processors) to access a system memory 624 and a mass storage memory 625.

The system memory 624 may include any desired type of volatile and/or non-volatile memory such as, for example, static random access memory (SRAM), dynamic random access memory (DRAM), flash memory, read-only memory (ROM), etc. The mass storage memory 625 may include any desired type of mass storage device including hard disk drives, optical drives, tape storage devices, etc.

The I/O controller 622 performs functions that enable the processor 612 to communicate with peripheral input/output (I/O) devices 626 and 628 and a network interface 630 via an I/O bus 632. The I/O devices 626 and 628 may be any desired type of I/O device such as, for example, a keyboard, a video display or monitor, a mouse, etc. The network interface 630 may be, for example, an Ethernet device, an asynchronous transfer mode (ATM) device, an 802.11 device, a digital subscriber line (DSL) modem, a cable modem, a cellular modem, etc. that enables the processor system 610 to communicate with another processor system.

While the memory controller 620 and the I/O controller 622 are depicted in FIG. 6 as separate functional blocks within the chipset 618, the functions performed by these blocks may be integrated within a single semiconductor circuit or may be implemented using two or more separate integrated circuits.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A computer implemented method to generate a market change descriptor, comprising:
    receiving, a query input associated with a market input parameter during a time-frame of interest;
    identifying, with a processor, at least one candidate external application based on the query input;
    retrieving volume information from the at least one candidate external application, the retrieved volume information associated with a current time-frame and the time-frame of interest;
    identifying a volume change composition of the market input parameter by calculating whether a volume change direction associated with the retrieved volume information is the same for a baseline volume and an incremental volume; and
    assigning a market change descriptor to the market input parameter based on the calculated change direction.

2. A method as described in claim 1, wherein identifying the at least one candidate external application comprises querying an external application table to determine one or more external applications having at least one of market data or market analysis techniques associated with the query input.

3. A method as described in claim 1, wherein calculating the volume change direction associated with the retrieved volume information further comprises calculating a percent volume change between the current time-frame and the time-frame of interest.

4. A method as described in claim 3, further comprising assigning the market change descriptor based on the calculated percent volume change.

5. A method as described in claim 4, wherein the assigned market change descriptor comprises at least one of an indication of increased volume or an indication of decreased volume.

6. A method as described in claim 4, further comprising constructing a volume sentence including a template sentence.

7. A method as defined in claim 6, wherein the template sentence is retrieved from a smart text database and further comprises a plurality of customization fields.

8. A method as defined in claim 7, wherein the customization fields comprise a target market field.

9. A method as defined in claim 7, wherein the customization fields comprise a time-frame field.

10. A method as defined in claim 7, wherein the customization fields comprise a product of interest field.

11. A method as defined in claim 7, wherein the customization fields comprise a volume change descriptor field.

12. A method as defined in claim 7, wherein the customization fields comprise a raw value change field.

13. A method as defined in claim 7, further comprising populating the customization fields based on the calculated percent volume change.

14. A method as defined in claim 1, wherein the identified volume change composition comprises baseline drivers.

15. A method as defined in claim 14, wherein the baseline drivers comprise at least one of price-point factors or seasonal factors.

16. A method as defined in claim 1, wherein the identified volume change composition comprises incremental drivers.

17. A method as defined in claim 16, wherein the incremental drivers comprise at least one of promotional factors or advertising factors.

18. A method as defined in claim 1, further comprising comparing at least one of the baseline volume or the incremental volume to a threshold to determine a contribution sentence.

19. An apparatus to generate a market change description, comprising:
    an input module to receive user input;
    an external application table to identify at least one external application candidate based on the received user input;
    a volume calculator to retrieve volume information from the identified at least one external application candidate, and to calculate a volume change composition by determining whether a volume change direction associated with the user input is the same for a baseline volume and an incremental volume; and
    a text generator to retrieve a template market change description sentence based on the change direction, at least one of the input module, the external application table, the volume calculator or the text generator comprising a processor.

20. An apparatus as defined in claim 19, further comprising a smart text database communicatively connected to the text generator to provide the market change description sentence.

21. An apparatus as defined in claim 19, further comprising a baseline/incremental calculator to differentiate volume due to a baseline factor from volume due to an incremental factor.

22. A tangible machine readable storage medium comprising machine-accessible instructions that, when executed, cause a machine to, at least:
 identify a candidate external application based on a query input associated with a market input parameter during a time-frame of interest;
 retrieve volume information from the candidate external application, the retrieved volume information associated with a current time-frame and the time-frame of interest;
 identify a volume change composition of the market input parameter by calculating whether a volume change direction associated with the retrieved volume information is the same for a baseline volume and an incremental volume; and
 assign a market change language descriptor to the market input parameter based on the calculated change direction.

23. An article of manufacture as described in claim 22, wherein the machine-accessible instructions, when executed, cause the machine to query an external application table to determine an external application having at least one of market data or market analysis techniques associated with the query input.

24. An article of manufacture as described in claim 22, wherein the machine-accessible instructions, when executed, cause the machine to calculate a percent volume change between the current time-frame and the time-frame of interest.

25. An article of manufacture as described in claim 24, wherein the machine-accessible instructions, when executed, cause the machine to assign the market change language descriptor based on the calculated percent volume change.

26. An article of manufacture as described in claim 25, wherein the machine-accessible instructions, when executed, cause the machine to construct a volume sentence including a template sentence.

27. An article of manufacture as described in claim 26, wherein the machine-accessible instructions, when executed, cause the machine to apply a plurality of customization fields to the template sentence.

28. An article of manufacture as described in claim 27, wherein the machine-accessible instructions, when executed, cause the machine to apply a target market field customization.

29. An article of manufacture as described in claim 27, wherein the machine-accessible instructions, when executed, cause the machine to apply a time-frame field customization.

30. An article of manufacture as described in claim 27, wherein the machine-accessible instructions, when executed, cause the machine to apply a product of interest field customization.

31. An article of manufacture as described in claim 27, wherein the machine-accessible instructions, when executed, cause the machine to apply a volume change descriptor field customization.

32. An article of manufacture as described in claim 27, wherein the machine-accessible instructions, when executed, cause the machine to apply a raw value change field customization.

33. An article of manufacture as described in claim 22, wherein the machine-accessible instructions, when executed, cause the machine to identify a baseline driver composition.

34. An article of manufacture as described in claim 22, wherein the machine-accessible instructions, when executed, cause the machine to identify an incremental driver composition.

35. An article of manufacture as described in claim 22, wherein the machine-accessible instructions, when executed, cause the machine to compare at least one of the baseline volume or the incremental volume to a threshold to determine a contribution sentence.

* * * * *